US010004035B2

(12) United States Patent
Hsu et al.

(10) Patent No.: US 10,004,035 B2
(45) Date of Patent: Jun. 19, 2018

(54) METHOD OF MANAGING DATA TRANSMISSION FOR WIRELESS SYSTEM

(71) Applicant: MEDIATEK INC., Hsin-Chu (TW)

(72) Inventors: Chia-Hsiang Hsu, Kaohsiung (TW); Ching-Hwa Yu, Tainan (TW); Li-Chun Ko, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 426 days.

(21) Appl. No.: 14/512,479

(22) Filed: Oct. 13, 2014

(65) Prior Publication Data

US 2016/0105887 A1  Apr. 14, 2016

(51) Int. Cl.

| | |
|---|---|
| G01R 31/08 | (2006.01) |
| H04L 5/14 | (2006.01) |
| H04B 7/00 | (2006.01) |
| H04J 3/00 | (2006.01) |
| H04W 52/02 | (2009.01) |
| H04L 5/00 | (2006.01) |
| H04W 16/14 | (2009.01) |
| H04W 72/12 | (2009.01) |
| H04W 74/08 | (2009.01) |

(52) U.S. Cl.
CPC ....... H04W 52/0209 (2013.01); H04L 5/0078 (2013.01); H04W 16/14 (2013.01); H04W 72/12 (2013.01); H04W 74/0816 (2013.01); *Y02D 70/00* (2018.01); *Y02D 70/1262* (2018.01); *Y02D 70/142* (2018.01); *Y02D 70/144* (2018.01); *Y02D 70/146* (2018.01)

(58) Field of Classification Search
CPC ......... H04W 52/0209; H04W 72/1205; H04W 72/1228; H04W 24/10; H04W 16/14
See application file for complete search history.

(56) References Cited

U.S. PATENT DOCUMENTS

| | | | |
|---|---|---|---|
| 2008/0112351 A1* | 5/2008 | Surineni | H04W 74/0816 370/312 |
| 2012/0281533 A1* | 11/2012 | Xhafa | H04W 24/08 370/230 |
| 2013/0273848 A1* | 10/2013 | Kumar | H04W 72/1215 455/41.2 |
| 2014/0341100 A1* | 11/2014 | Sun | H04W 52/0238 370/311 |
| 2015/0103713 A1* | 4/2015 | Lee, II | H04W 52/0235 370/311 |
| 2015/0382303 A1* | 12/2015 | Katz | H04W 52/0245 370/311 |

* cited by examiner

*Primary Examiner* — Brian Roberts
*Assistant Examiner* — Abu-Sayeed Haque
(74) *Attorney, Agent, or Firm* — Wolf, Greenfield & Sacks, P.C.

(57) ABSTRACT

A method of managing data transmission for a receiving terminal of a first wireless system wherein the first wireless system coexists with at least one second wireless system includes receiving a transmission schedule of each of the at least one second wireless system; determining a usable time period for the first wireless system according to the transmission schedule of each of the at least one second wireless system; and sending a clear to send (CTS) to self signal or a power saving signal to indicate an interruption of the usable time period according to a length of the usable time period.

18 Claims, 5 Drawing Sheets

METHOD OF MANAGING DATA TRANSMISSION FOR WIRELESS SYSTEM

BACKGROUND

The present invention relates to a method of managing data transmission for a wireless system, and more particularly, to a method of reducing or eliminating interference for the wireless system.

With rapid development of wireless communication technology, mobile communication products have become indispensable in daily life. In a wireless communication system, data is transferred between two or more points via the air without wire connections. Such communication allows a mobile device to be connected to the network when the mobile device moves from place to place.

Among modern wireless systems, long-term evolution (LTE), worldwide interoperability for microwave access (WiMAX), Bluetooth and wireless fidelity (Wi-Fi) systems have operating frequency bands allocated in the spectrum ranging from 2300 MHz to 2690 MHz. In a mobile device with various wireless communication functions such as multiple profiles or multiple links of Bluetooth, and concurrence of wireless fidelity (Wi-Fi), there may be various homogeneous or heterogeneous wireless systems coexisting in the same channel. These wireless systems located in the same or near frequency may interfere with each other when coexisting in the same channel. In order to reduce the interference, time division multiplexing can be incorporated with data transmission scheduling; that is, each wireless system can only transmit data within an allocated period. For example, the LTE and WiMAX systems define scheduling methods in their protocols. In Bluetooth, the scheduling of data transmission may be controlled by the host. However, as for the Wi-Fi system that conforms to IEEE 802.11 standard, carrier sense multiple accesses with collision avoidance (CSMA/CA) is used to prevent collisions between Wi-Fi apparatuses. However, there's so far no good method to reduce interference when the Wi-Fi system coexists with other Wi-Fi system or other heterogeneous wireless communication systems. Thus, there is a need for improvement over the prior art.

SUMMARY

It is therefore an objective of the present invention to provide a method of managing data transmission for a wireless system capable of reducing or eliminating interference between homogeneous and/or heterogeneous wireless systems.

The present invention discloses a method of managing data transmission for a first wireless system, wherein the first wireless system coexists with at least one second wireless system. The method comprises receiving a transmission schedule of each of the at least one second wireless system; determining a usable time period for the first wireless system according to the transmission schedule of each of the at least one second wireless system; and sending a clear to send (CTS) to self signal or a power saving signal to indicate an interruption of the usable time period according to a length of the usable time period.

The present invention further discloses a method for a transmitting terminal of a first wireless system, wherein the first wireless system coexists with at least one second wireless system. The method comprises transmitting a transmission schedule of each of the at least one second wireless system to a receiving terminal of the first wireless system; determining a usable time period for the first wireless system according to the transmission schedule of each of the at least one second wireless system; and receiving a clear to send (CTS) to self signal or a power saving signal to indicate an interruption of the usable time period according to a length of the usable time period.

These and other objectives of the present invention will no doubt become obvious to those of ordinary skill in the art after reading the following detailed description of the preferred embodiment that is illustrated in the various figures and drawings.

DETAILED DESCRIPTION

There are two common methods for the Wi-Fi receiving terminal to inform the Wi-Fi transmitting terminal to stop transmission. One method uses a power saving signal to indicate that the Wi-Fi receiving terminal will enter a suspend mode or a power save mode. The other method utilizes network allocation vector (NAV) mechanism, where the Wi-Fi receiving terminal sends a clear to send (CTS) to self signal to indicate that receiving terminal will occupy the channel for a duration.

In the power saving method, the Wi-Fi receiving terminal sends a power saving signal to the Wi-Fi transmitting terminal to indicate that the Wi-Fi receiving terminal is temporarily disabled and is not able to receive data within a specific period of time. When the Wi-Fi transmitting terminal receives the power saving signal from the Wi-Fi receiving terminal, the Wi-Fi transmitting terminal may stop transmitting data to the Wi-Fi receiving terminal after a delay time. In other words, the Wi-Fi transmitting terminal may be aware that the receiving terminal has entered the power saving mode after a delay time, and thus may not stop transmitting data immediately when receiving the power saving signal.

In the NAV method, the Wi-Fi receiving terminal sends a CTS to self signal to indicate that Wi-Fi data transmission is prohibited within a specific period of time. When the Wi-Fi transmitting terminal receives the CTS to self signal from the Wi-Fi receiving terminal, the Wi-Fi transmitting terminal may stop transmitting data to the Wi-Fi receiving terminal immediately without significant delay. When the NAV method is applied, however, a whole basic service set (BSS) or other Wi-Fi nodes that receive the CTS to self signal will be informed that the Wi-Fi system is busy and may stop sending packets within the specific period of time. In such a condition, the whole Wi-Fi system is disabled, and transmission of other data in the Wi-Fi system may be stopped.

Figure 1:
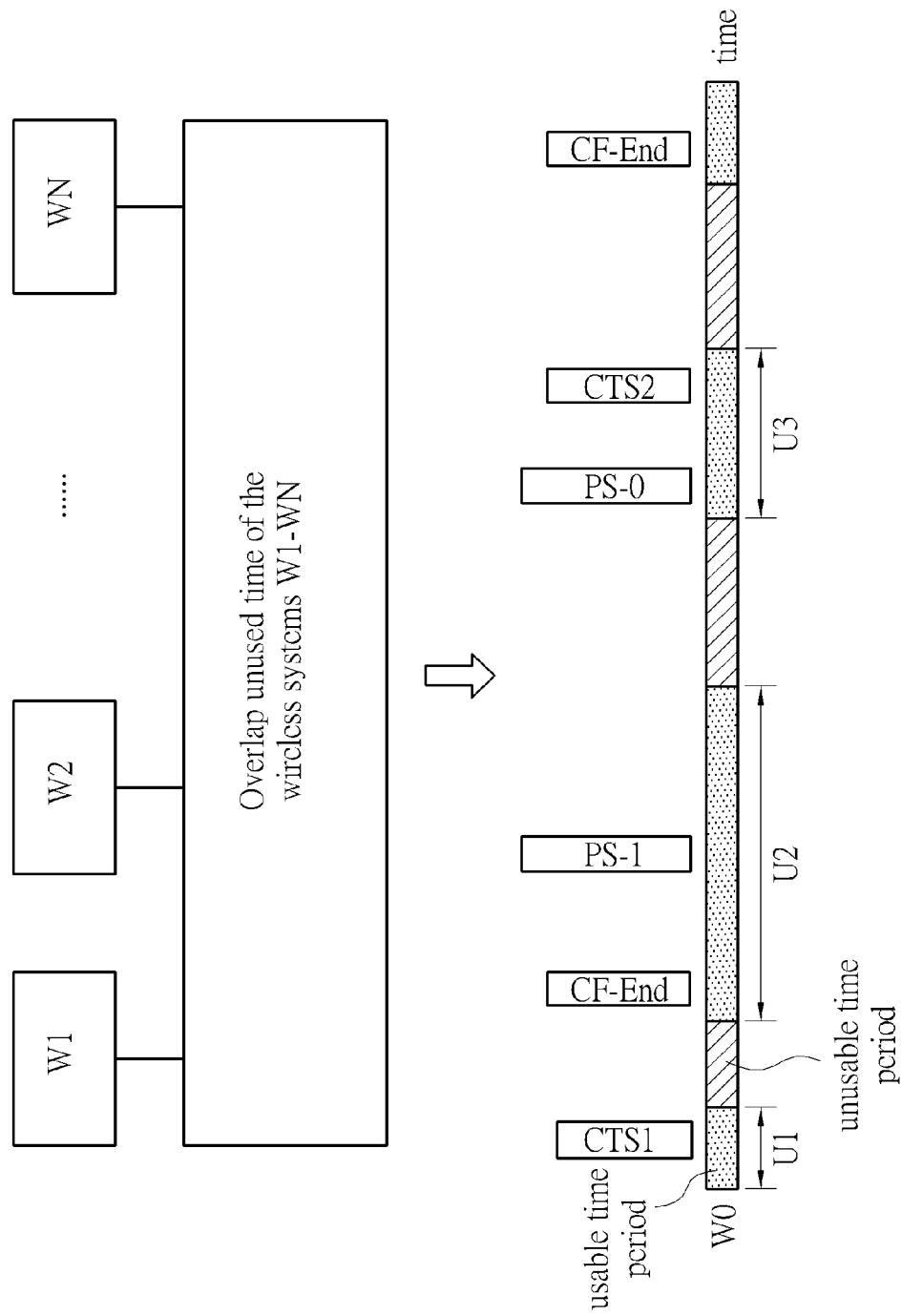
FIG. 1 is a schematic diagram of a timeline of a wireless system according to an embodiment of the present invention.

In order to prevent the whole Wi-Fi system from being disabled, it is desirable to use the power saving method to indicate an interruption of data transmission of the Wi-Fi system when there is enough delay time for the Wi-Fi transmitting terminal to stop its transmission. If the delay time is not long enough, the NAV method may be a preferable method. Please refer to FIG. 1, which is a schematic diagram of a timeline of a wireless system W0 according to an embodiment of the present invention. As shown in FIG. 1, the wireless system W0 coexists with N wireless systems W1-WN. Data transmissions of the wireless systems W0-WN are configured by using time division multiplexing. Each of the wireless systems W1-WN has a schedule for data transmission, but the wireless system W0 does not. Thus, data transmission of the wireless system W0 should be performed in a period of time when none of the wireless systems W1-WN uses the channel.

Please keep referring to FIG. 1. The receiving terminal of the wireless system W0 first receives the transmission schedules from the wireless systems W1-WN. Each of the wireless systems W1-WN has a transmission schedule indicating when the wireless system uses or does not use the interface. The receiving terminal of the wireless system W0 receives the scheduling information and integrates such information to determine a usable time period for the wireless system W0 in the channel. In other words, if none of the wireless systems W1-WN uses the channel in a period of time, this period of time is considered as a usable time period; if some of the wireless systems W1-WN use the channel in a period of time, the wireless system W0 will not be able to use this period of time, and this time is considered as an unusable time period. As shown in FIG. 1, the receiving terminal of the wireless system W0 receives the transmission schedules from the wireless systems W1-WN, in order to obtain usable time periods (dotted area) and unusable time periods (oblique line area) in the timeline of the wireless system W0. The transmitting terminal of the wireless system W0 is only allowed to transmit data to the receiving terminal within the usable time periods, but is not allowed to transmit data within the unusable time periods.

Figure 2:
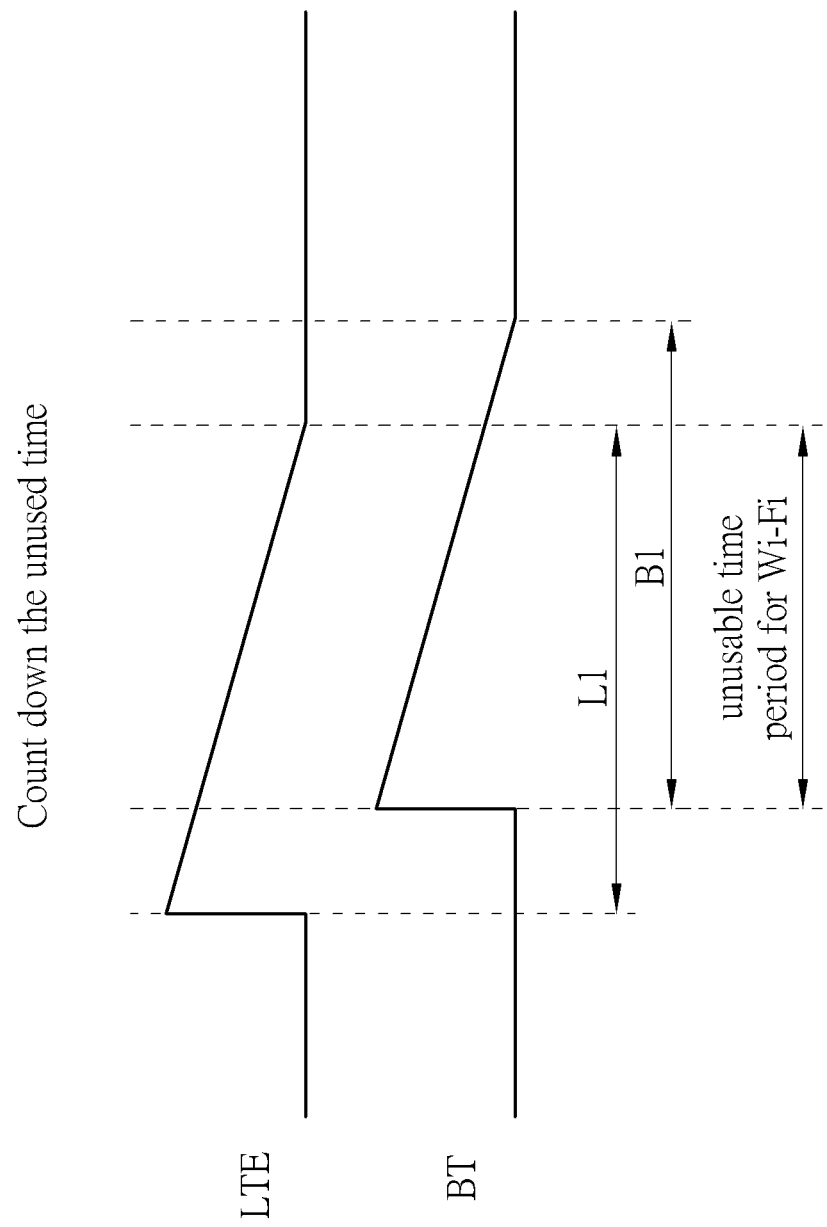
FIG. 2 is a schematic diagram of determining a usable time period for a wireless fidelity system which coexists with a long-term evolution system and a Bluetooth system.

In an embodiment, the receiving terminal of the wireless system W0 may count a subsequent unused time of each of the wireless systems W1-WN, and overlap the subsequent unused time of each of the wireless systems W1-WN to obtain the usable time period for the wireless system W0. Please refer to FIG. 2, which is a schematic diagram of determining a usable time period for a Wi-Fi system which coexists with a long-term evolution (LTE) system and a Bluetooth (BT) system. As shown in FIG. 2, the Wi-Fi system uses a counter to count down the unused time of the LTE and BT systems, and obtains an unused time period L1 for the LTE system and an unused time period B1 for the BT system. The overlapping area of the time periods L1 and B1 is the usable time period for the Wi-Fi system. In this way, the receiving terminal may determine whether or when the usable time period is upcoming.

Please keep referring to FIG. 1. Before a usable time period is finished, the receiving terminal of the wireless system W0 sends a CTS to self signal or a power saving signal to the transmitting terminal to indicate the interruption of the usable time period. As mentioned above, when there is enough delay time for the transmitting terminal to stop its transmission, the receiving terminal may send the power saving signal; otherwise, the receiving terminal may send the CTS to self signal. As shown in FIG. 1, there are three usable time periods U1-U3 for the wireless system W0. The usable time period U2 is long enough to provide the delay time for the transmitting terminal; thus, the receiving terminal may send the power saving signal PS-1 to indicate the interruption of the usable time period U2, and a buffer time is reserved before the end of the usable time period U2. On the other hand, the usable time periods U1 and U3 are shorter and may not be long enough to provide the delay time; thus the receiving terminal may send the CTS to self signals CTS1 and CTS2 to the transmitting terminal at the end of the usable time periods U1 and U3, respectively.

If the power saving signal PS-1 is sent to indicate the interruption of the usable time period, when the wireless system is usable again, a signal PS-0 is sent to indicate that another usable time period starts, where the signal PS-0 means that the receiving terminal leaves the power save mode and starts to perform data transmission. If the CTS to self signal CTS1 or CTS2 is sent to indicate the interruption of the usable time period, when the wireless system is usable again, a signal CF-End is sent to indicate that another usable time period starts. The signal CF-End means that a contention free (CF) period ends and the terminals or nodes in the wireless system may start to contend for transmitting data in the channel. Such a signal can be utilized for releasing the CTS to self condition.

In order to ensure whether there is enough delay time for the transmitting terminal of the wireless system W0, the receiving terminal may send the power saving signal or the CTS to self signal to the transmitting terminal to indicate the interruption of a usable time period according to the length of the usable time period. The receiving terminal first determines whether the length of the usable time period is greater than or smaller than a threshold. If the length of the usable time period is smaller than the threshold, the receiving terminal sends the CTS to self signal to indicate the interruption of the usable time period. If the length of the usable time period is greater than the threshold, the receiving terminal sends the power saving signal to indicate the interruption of the usable time period.

Figure 3:
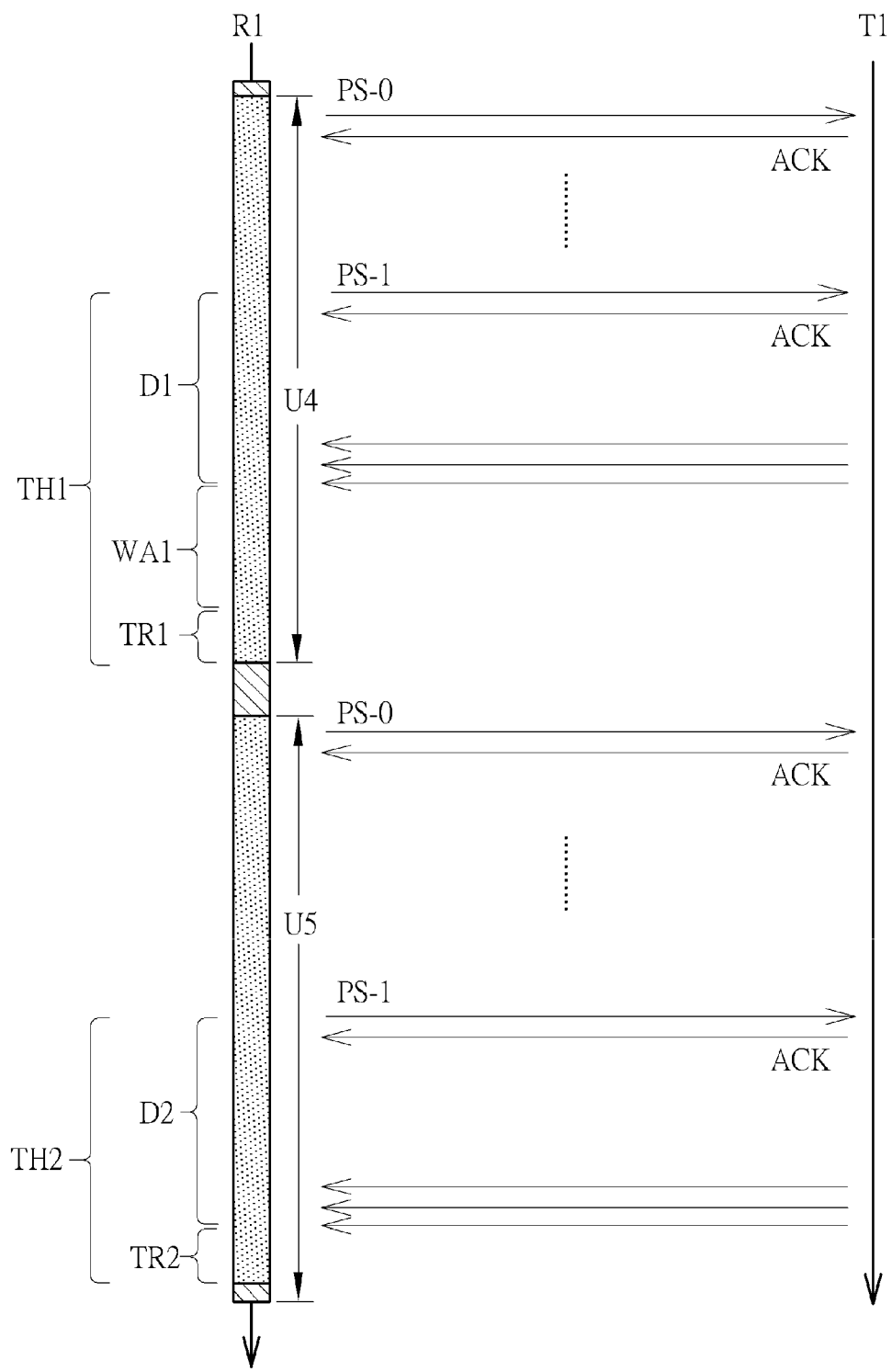
FIG. 3 is a schematic diagram of threshold adjustment when a receiving terminal of a wireless system sends power saving signals to a transmitting terminal according to an embodiment of the present invention.

The threshold for determining whether the CTS to self signal or the power saving signal is sent may be determined or adjusted according to the condition of the channel. Please refer to FIG. 3, which is a schematic diagram of threshold adjustment when a receiving terminal R1 of a wireless system sends power saving signals to a transmitting terminal T1 according to an embodiment of the present invention. As shown in FIG. 3, in the timeline of the receiving terminal R1, the dotted area denotes the usable time periods and the oblique line area denotes the unusable time periods. In this embodiment, there are two usable time periods U4 and U5 for the wireless system.

The usable time period U4 is long enough to provide a delay time for the transmitting terminal to be aware that the receiving terminal will enter the power save mode, so that the receiving terminal may send a power saving signal PS-1 to indicate the interruption of the usable time period U4. Since the delay time is required by the transmitting terminal, the power saving signal PS-1 may not be sent at the end of the usable time period U4; instead, it should be sent at a moment before the usable time period U4 ends. As shown in FIG. 3, at the beginning of the usable time period U4, the receiving terminal sends a signal PS-0 to notify the transmitting terminal that the usable time period U4 starts, and the transmitting terminal replies an ACK to the receiving terminal. After a period of time, the receiving terminal sends the power saving signal PS-1 to indicate that the usable time period U4 will finish in a period, and this period is usually equal to the threshold TH1 for determining whether the power saving signal or the CTS to self signal is sent. The delay time D1 for the transmitting terminal, which is equal to a time difference between the receiving terminal sending the power saving signal PS-1 and receiving the last signal from the transmitting terminal within the usable time period U4, may be utilized for determining the threshold TH1. After the last signal is sent, the transmitting terminal may be aware that the receiving terminal will enter the power save mode and stop sending data to the receiving terminal. A tolerance time TR1 is further included, in order to prevent the data packets from being sent after the follow-up unusable period starts, which may occur when the data packets or the power saving signal PS-1 is delayed because the channel becomes tough.

In addition to the delay time D1 and the tolerance time TR1, a waste time WA1 also exists in the threshold TH1. In other words, the threshold TH1 is too large, and the waste time WA1 should be eliminated in the follow-up usable time periods. As shown in FIG. 3, a new threshold TH2 is determined in the usable time period U5. At a moment before the end of the usable time period U5, the receiving terminal sends the power saving signal PS-1 to indicate that the receiving terminal will enter power save mode in the threshold TH2 of time. The threshold TH2 includes a delay time D2 and a tolerance time TR2. The delay time D2 may be determined to be equal to the delay time D1, and the tolerance time TR2 is also equal to the tolerance time TR1. In such a condition, no extra time is wasted, and the threshold TH2 may be adjusted to an optimal value.

Please note that, if the threshold value is too large, the transmitting terminal may stop transmitting data too early, which causes a waste in the usage of channel and reduction of data transmission efficiency. If the threshold value is too small, the last few packets may be sent in the unusable time period and interfere with packets of other wireless systems. The embodiment provided herein allows the wireless system to dynamically adjust the threshold value and adapt the threshold value to the condition of the channel, in order to achieve an optimal tradeoff between higher efficiency and lower interference.

Figure 4:
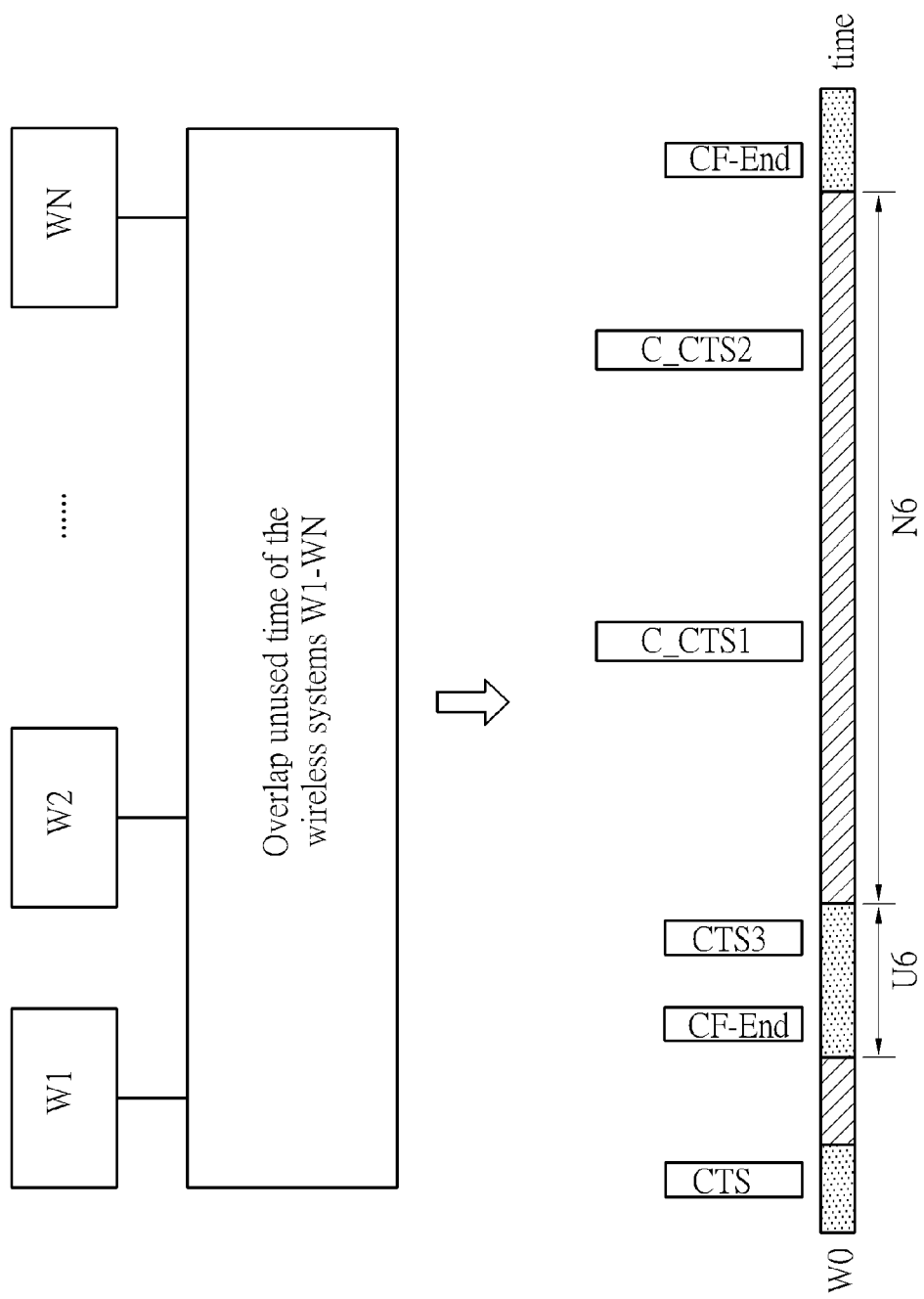
FIG. 4 is a schematic diagram of an unusable time period longer than the protection duration of a clear to send to self signal for the wireless system according to an embodiment of the present invention.

In an embodiment, when a CTS to self signal is applied, the unusable time period following the CTS to self signal may be longer than a protection duration of the CTS to self signal. Please refer to FIG. 4, which is a schematic diagram of an unusable time period N6 longer than the protection duration of a CTS to self signal CTS3 for the wireless system W0 according to an embodiment of the present invention. As shown in FIG. 4, when the CTS to self signal CTS3 is sent to indicate an interruption of a usable time period U6, the receiving terminal may determine whether the unusable time period N6 following the usable time period U6 is longer than the protection duration of the CTS to self signal CTS3. When the unusable time period N6 is longer than the protection duration of the CTS to self signal CTS3, the wireless system W0 may transmit data in the unusable time period and interfere with other wireless systems without extra protections after the protection duration of the CTS to self signal CTS3 ends. In such a condition, the receiving terminal of the wireless system W0 may send a cascade CTS to self signal to indicate that the channel will still be busy for a period. As shown in FIG. 4, the receiving terminal may send a cascade CTS to self signal C_CTS1 before or at the end of the protection duration of the CTS to self signal CTS3, and send a cascade CTS to self signal C_CTS2 before or at the end of the protection duration of the CTS to self signal C_CTS1, in order to continue the channel protection. Please note that, the cascade CTS to self signal may also be sent after the protection duration of the previous CTS to self signal ends, but the protection duration may be interrupted in this case. Since the wireless system W0 has received the transmission schedules of other coexisting wireless systems, it is able to predetermine the length of the unusable time period. The number of cascade CTS to self signals required in each unusable time period may be determined accordingly.

Figure 5:
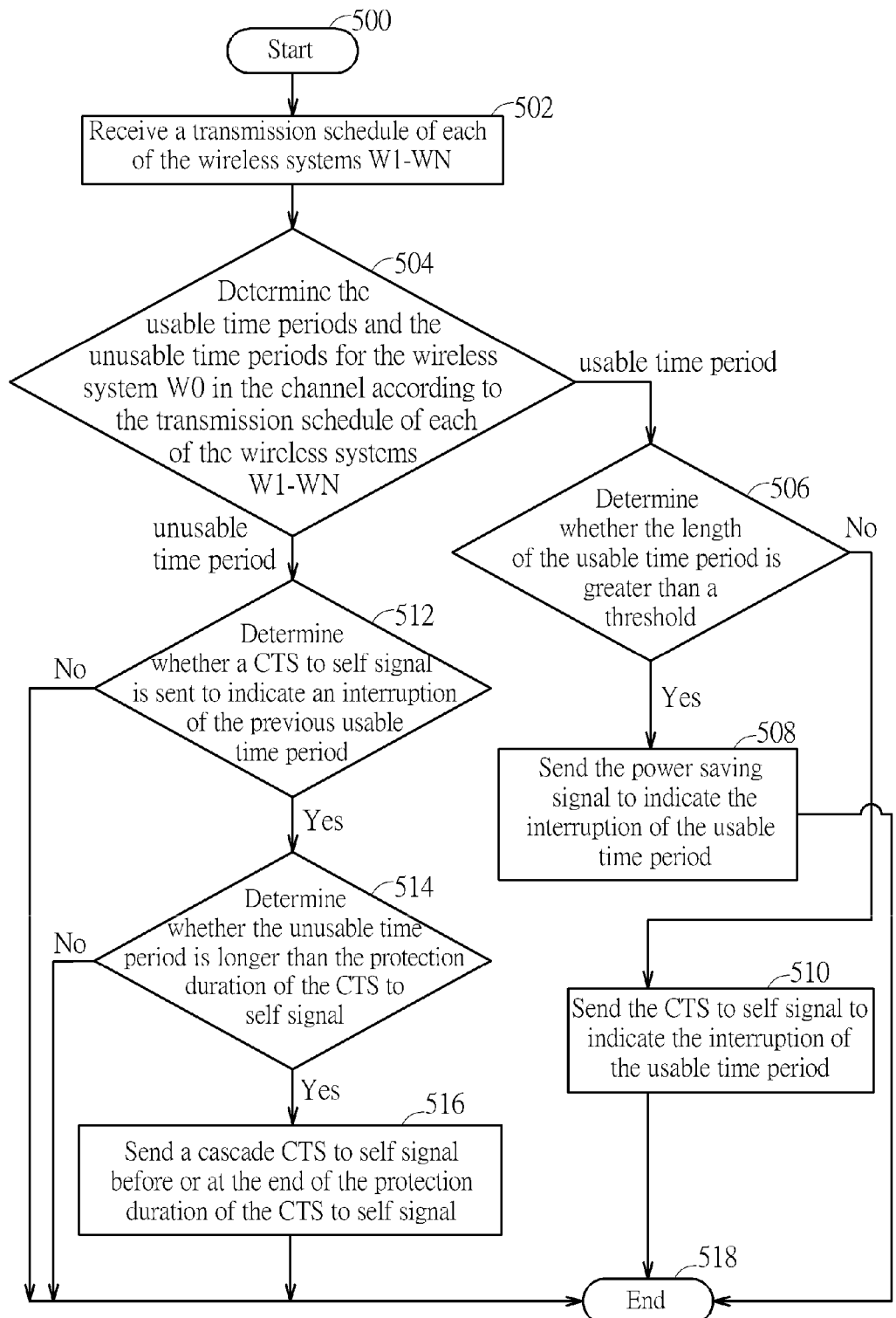
FIG. 5 is a schematic diagram of a process according to an embodiment of the present invention.

The above operations of managing data transmission for the receiving terminal of the wireless system W0 coexisting with the wireless systems W1-WN and using the power saving signal or the CTS to self signal to prevent the packets of the wireless system W0 from interfering with the wireless systems W1-WN in the channel can be summarized into a process 50, as shown in FIG. 5. The process 50 includes the following steps:

Step 500: Start.

Step 502: Receive a transmission schedule of each of the wireless systems W1-WN.

Step 504: Determine the usable time periods and the unusable time periods for the wireless system W0 in the channel according to the transmission schedule of each of the wireless systems W1-WN. If a usable time period is upcoming, go to Step 506; if an unusable time period is upcoming, go to Step 512.

Step 506: Determine whether the length of the usable time period is greater than a threshold. If yes, go to Step 508; otherwise, go to Step 510.

Step 508: Send the power saving signal to indicate the interruption of the usable time period, and go to Step 518.

Step 510: Send the CTS to self signal to indicate the interruption of the usable time period, and go to Step 518.

Step 512: Determine whether a CTS to self signal is sent to indicate an interruption of the previous usable time period. If yes, go to Step 514; otherwise, go to Step 518.

Step 514: Determine whether the unusable time period is longer than the protection duration of the CTS to self signal. If yes, go to Step 516; otherwise, go to Step 518.

Step 516: Send a cascade CTS to self signal before or at the end of the protection duration of the CTS to self signal.

Step 518: End.

Please note that the process 50 can be performed each time when a usable time period or an unusable time period is upcoming. The detailed operations of the process 50 are illustrated in the above paragraphs, and will not be narrated herein.

The present invention provides a method of managing data transmission for a wireless system, which is capable of reducing or eliminating interference between homogeneous and/or heterogeneous wireless systems by using the power saving method or the NAV method according to the length of the usable time period for the wireless system. Those skilled in the art can make modifications and alternations accordingly. For example, in the above embodiment, the threshold is determined according to the timing difference between the receiving terminal sending the last power saving signal and receiving the last signal from the transmitting terminal within the same usable time period, in order to be adapted to the latest condition of the channel. In other embodiments, other methods may also be applied to achieve optimal threshold value for determining whether the power saving signal or the CTS to self signal should be sent. In addition, the method provided herein conforms to IEEE 802.11 standard and may be applied to Wi-Fi systems, but should not be limited to this.

In summary, the present invention effectively deals with data transmission in a wireless system when the wireless system coexists with other homogeneous or heterogeneous wireless systems. The wireless system may determine usable time periods and unusable time periods according to the transmission schedules from other wireless systems, and use the power saving signal or the CTS to self signal to indicate the interruption of a usable time period. If there is enough delay time reserved for the transmitting terminal in the usable time period, the power saving signal is a preferable choice; otherwise, the CTS to self signal may be applied. The threshold for determining whether the power saving signal or the CTS to self signal should be used may be adjusted dynamically and adapted to the condition of the air. Moreover, if the length of an unusable time period is greater than the protection duration of a corresponding CTS to self signal, a cascade CTS to self signal may be sent to continue the protection. As a result, a complete protection mechanism for preventing interference between different wireless systems can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing data transmission for a first wireless system, wherein the first wireless system coexists with at least one second wireless system, the method comprising:
   receiving a transmission schedule of each of the at least one second wireless system;
   determining a usable time period for the first wireless system according to the transmission schedule of each of the at least one second wireless system;
   sending a clear to send (CTS) to self signal to indicate an interruption of the usable time period when the usable time period has a first length; and
   sending a power saving signal to indicate an interruption of the usable time period when the usable time period has a second length, wherein the second length is different from the first length,
   wherein the CTS to self signal and the power saving signal are different,
   wherein sending the power saving signal to indicate the interruption of the usable time period comprises:
   determining whether a length of the usable time period is greater than or smaller than a threshold; and
   sending the power saving signal to indicate the interruption of the usable time period when the length of the usable time period is greater than the threshold.

2. The method of claim 1, wherein the CTS to self signal is sent to indicate data transmission of the first wireless system is prohibited within a specific time period.

3. The method of claim 2, wherein a transmitting terminal of the first wireless system stops transmitting data to a receiving terminal immediately when receiving the CTS to self signal.

4. The method of claim 1, wherein the power saving signal is sent to indicate the receiving terminal of the first wireless system is temporarily disabled and is not able to receive data within a specific time period.

5. The method of claim 4, wherein a transmitting terminal of the first wireless system stops transmitting data to a receiving terminal after a delay time when receiving the power saving signal.

6. The method of claim 1, further comprising:
   allowing a transmitting terminal of the first wireless system to transmit data to a receiving terminal within usable time periods only.

7. The method of claim 1, wherein sending the CTS to self signal to indicate the interruption of the usable time period comprises:
   determining whether a length of the usable time period is greater than or smaller than a threshold; and
   sending the CTS to self signal to indicate the interruption of the usable time period when the length of the usable time period is smaller than the threshold.

8. The method of claim 7, wherein the threshold is determined according to a time when the receiving terminal sends a last power saving signal and a time when the receiving terminal receives a last signal within a same usable time period with the last power saving signal.

9. The method of claim 1, wherein when a first CTS to self signal is sent to indicate an interruption of a first usable time period, the method further comprises:
   determining whether an unusable time period following the first usable time period is longer than a protection duration of the first CTS to self signal; and
   sending a second CTS to self signal before or at the end of the protection duration of the first CTS to self signal when the unusable time period following the first usable time period is longer than the protection duration of the first CTS to self signal.

10. The method of claim 1, wherein the step of determining the usable time period for the first wireless system according to the transmission schedule of each of the at least one second wireless system comprises:
    counting a subsequent unused time of each of the at least one second wireless system.

11. The method of claim 10, further comprising:
    overlapping the subsequent unused time of each of the at least one second wireless system, in order to obtain the usable time period for the first wireless system.

12. The method of claim 1, wherein the first wireless system conforms to IEEE 802.11 standard.

13. The method of claim 1, wherein the second length is greater than the first length.

14. A method for a transmitting terminal of a first wireless system, wherein the first wireless system coexists with at least one second wireless system, the method comprising:
    transmitting a transmission schedule of each of the at least one second wireless system to a receiving terminal of the first wireless system;
    determining a usable time period for the first wireless system according to the transmission schedule of each of the at least one second wireless system;
    receiving a clear to send (CTS) to self signal indicating an interruption of the usable time period when the usable time period has a first length; and
    receiving a power saving signal indicating an interruption of the usable time period when the usable time period has a second length, wherein the second length is different from the first length,
    wherein the CTS to self signal and the power saving signal are different,
    wherein receiving the power saving signal to indicate the interruption of the usable time period comprises:
    in response to a determination whether a length of the usable time period is greater than or smaller than a threshold, receiving the power saving signal to indicate the interruption of the usable time period when the length of the usable time period is greater than the threshold.

15. The method of claim 14, wherein the CTS to self signal is sent to indicate data transmission of the first wireless system is prohibited within a specific time period.

16. The method of claim 14, further comprising:
stopping transmitting data to the receiving terminal immediately when receiving the CTS to self signal.

17. The method of claim 14, wherein the power saving signal is sent to indicate the receiving terminal of the first wireless system is temporarily disabled and is not to receive data within a specific time period.

18. The method of claim 14, further comprising:
stepping transmitting data to the receiving terminal after a delay time when receiving the power saving signal.

* * * * *